United States Patent
Klarén

(10) Patent No.: US 11,741,007 B2
(45) Date of Patent: Aug. 29, 2023

(54) MEMORY GUARDS FOR CONTINUOUS LOAD-ADAPTIVE PROCESSING OF TRANSACTIONS IN DATABASES

(71) Applicant: Neo4j Sweden AB, San Mateo, CA (US)

(72) Inventor: Anton Klarén, Malmö (SE)

(*) Notice: Subject to any disclaimer, the term of this patent is extended or adjusted under 35 U.S.C. 154(b) by 108 days.

(21) Appl. No.: 17/150,994

(22) Filed: Jan. 15, 2021

(65) Prior Publication Data
US 2022/0229776 A1 Jul. 21, 2022

(51) Int. Cl.
*G06F 12/06* (2006.01)
*G06F 16/23* (2019.01)
*G06F 16/21* (2019.01)

(52) U.S. Cl.
CPC .......... *G06F 12/0646* (2013.01); *G06F 16/21* (2019.01); *G06F 16/2379* (2019.01); *G06F 2212/1044* (2013.01)

(58) Field of Classification Search
CPC ...... G06F 12/02; G06F 16/21; G06F 16/2379; G06F 12/0646
See application file for complete search history.

(56) References Cited

U.S. PATENT DOCUMENTS

| | | | | |
|---|---|---|---|---|
| 8,661,206 B2* | 2/2014 | Kumar | ................. | G06F 9/3857 710/200 |
| 9,069,656 B2* | 6/2015 | McLachlan | ............. | G06F 21/14 |
| 10,216,821 B2* | 2/2019 | Cheenath | .............. | G06F 16/955 |
| 10,284,637 B2* | 5/2019 | Chin | ..................... | G06F 9/5055 |
| 2009/0138886 A1* | 5/2009 | Anand | .................... | G06F 9/524 718/104 |
| 2011/0082996 A1* | 4/2011 | Wester | .................... | G06F 16/21 711/170 |
| 2011/0161615 A1* | 6/2011 | Odaira | ................ | G06F 12/0269 711/E12.002 |
| 2012/0221765 A1* | 8/2012 | Yoo | ........................ | G06F 12/023 711/6 |
| 2014/0068201 A1* | 3/2014 | Fromm | ................. | G06F 12/084 711/148 |
| 2014/0372725 A1* | 12/2014 | Almasi | ................. | G06F 12/023 711/173 |
| 2015/0363133 A1* | 12/2015 | Bobroff | ................. | G06F 3/0631 711/170 |
| 2017/0075806 A1* | 3/2017 | Li | .......................... | G06F 9/5016 |
| 2017/0220621 A1* | 8/2017 | Colrain | ............... | G06F 16/2365 |
| 2020/0034236 A1* | 1/2020 | Williams | ................. | G06F 9/467 |
| 2020/0257676 A1* | 8/2020 | Zhang | .................... | G06F 9/466 |
| 2022/0027264 A1* | 1/2022 | Jain | ....................... | G06F 12/084 |

* cited by examiner

*Primary Examiner* — Huawen A Peng
(74) *Attorney, Agent, or Firm* — Van Pelt, Yi & James LLP

(57) ABSTRACT

Techniques are disclosed to manage use of a global pool of memory comprising at least a portion of the runtime-managed heap. A request to reserve use of a portion of the global pool of memory is received from each of a plurality of transactions comprising a transactional workload of a database management system. A corresponding portion of the global pool of memory is allocated to each of at least a subset of the requesting transactions, to be used as a local pool of memory available to be used by the transaction to process the transaction.

20 Claims, 4 Drawing Sheets

MEMORY GUARDS FOR CONTINUOUS LOAD-ADAPTIVE PROCESSING OF TRANSACTIONS IN DATABASES

BACKGROUND OF THE INVENTION

A graph database is a computerized record management system that uses a network structure with nodes, relationships, labels, and properties to represent data. A node may represent an entity such as a person, a business, an organization, or an account. Each node has zero or more labels that declare its role(s) in the network, for example as a customer or a product. Nodes have zero or more properties which contain user data. For example, if a node represents a person, the properties associated with that node may be the person's first name, last name, and age. Relationships connect nodes to create high fidelity data models. Relationships are directed, have a type which indicates their purpose and may also have associated property data (such as weightings).

Graph databases have various applications. For example, a graph database may be used in healthcare management, retail recommendations, transport, power grids, integrated circuit design, fraud prevention, and social networks, to name a few.

Updating a graph database in a safe manner uses a well-understood mechanism known as transaction processing. However, managing a concurrent transactional workload in a way that does not overwhelm the underlying computer server is difficult. Overly pessimistic resource utilization (particularly relatively scarce areas of main memory like the heap) leads to meagre throughput, while managing resources poorly will lead to database instability as resources required to continue processing are exhausted.

Some databases accept that transaction processing is demanding and use very large heap spaces to accommodate the workload. However, in a managed heap (which are common in language modern runtimes) this potentially stores up a long period of unavailability as the heap is garbage-collected for old memory allocations.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques are disclosed to provide continuity of database transaction processing in a load-adaptive manner such that an optimal throughput can be achieved safely for a given workload and computer server capacity. In various embodiments, a system as disclosed herein adapts overall utilization to the current workload based on the size of the heap allocation. Transactions ask for heap memory as they need it. If sufficient heap memory is available, then further progress is allowed. If not, the transaction is aborted, and memory is freed to allow other transactions to make progress. In various embodiments, the system optimizes for throughput of transactions in the best case, while safely aborting a transaction for which there is insufficient memory in the worst case, allowing other transactions to continue. Memory utilization does not exceed the size of the global pool, in various embodiments, protecting the stability of the runtime that manages the heap.

Figure 1A:
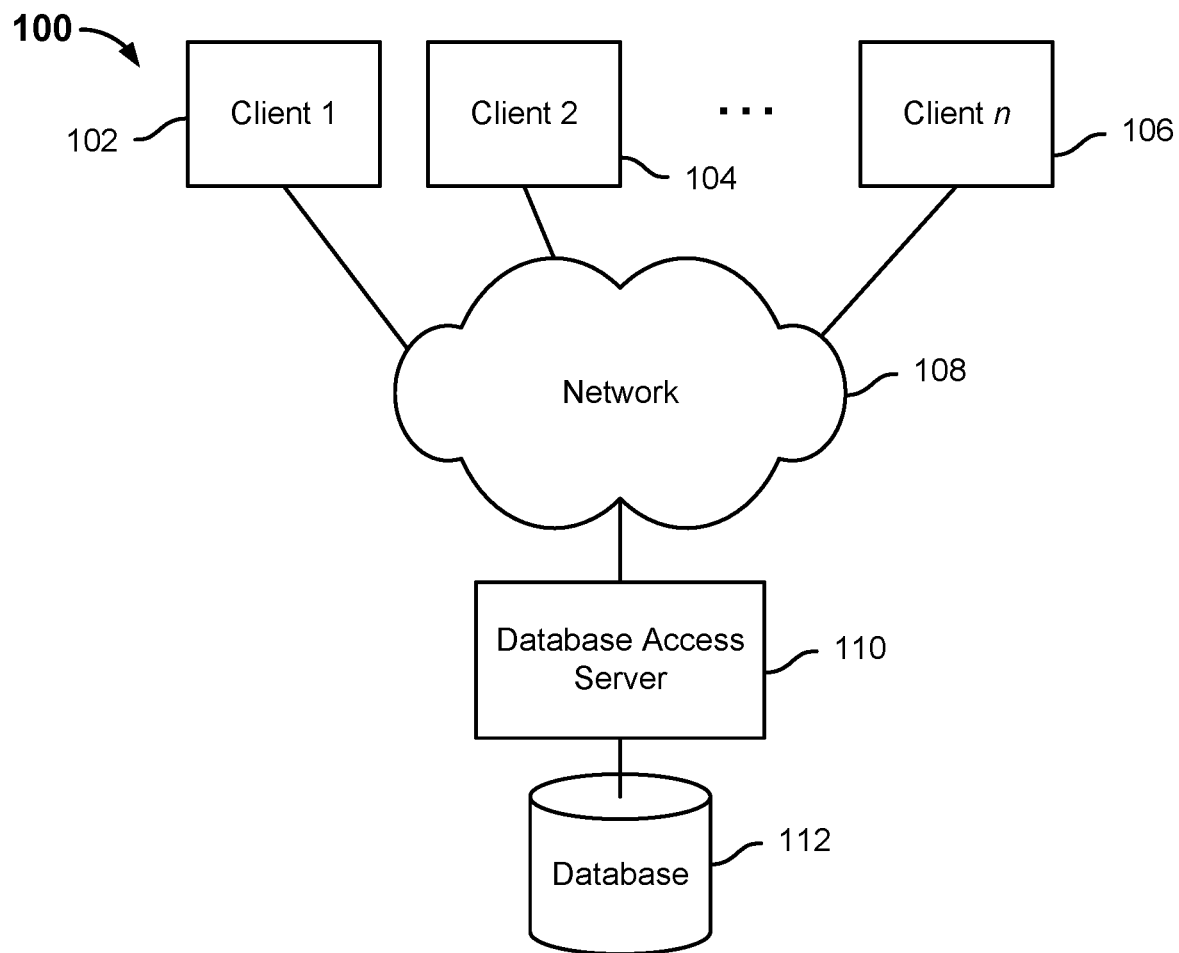
FIG. 1A is a block diagram illustrating an embodiment of a graph database system and environment.

FIG. 1A is a block diagram illustrating an embodiment of a graph database system and environment. In the example shown, graph database system and environment 100 includes a plurality of client systems and/or devices, represented in FIG. 1 by clients 102, 104, and 106. Each client is connective via one or more networks 108, such as the Internet, to a database access server 110. Database access server 110 is configured to provide access to one or more graph databases stored in database 112. Clients, such as clients 102, 104, and 106 submit requests to database access server 110 via network 108, such as to update data in a graph stored in database 112. Each requested update is performed by a transaction that runs on database access server 110.

To ensure the integrity of data, graph databases need to manage updates in a careful manner which ensures that no partial updates are permitted: no updates are visible as they are in-flight, that all updates are executed in a logically serialized manner, and that once updates are made they are persistent. These are known as the ACID properties of a database and updates applied in this manner are known as ACID transactions. An ACID transaction's update is either fully applied (committed) or not applied at all (aborted) when it completes.

Maintaining the ACID properties in practice comes up against limitations of physical computing machinery. The physical capacity of a computer server, such as database access server 110, may impact the ability of transaction management algorithms to maintain throughput or stability for a given transactional workload.

The concerns of resource utilization and server stability are amplified when the database management system offloads memory management functionality onto a middle layer—a so-called Virtual Machine, such as the Java Virtual Machine (JVM)—between its software and the underlying computer operating system.

Runtimes like the JVM are commonplace in modern software systems. They greatly simplify memory management for a wide variety of applications by providing an area in the computer memory called the managed heap. This where software objects can be allocated by the programmer and subsequently—when those objects are no longer required by the program—deallocated by an algorithm called the garbage collector.

However, the managed runtimes were not expressly designed with database management systems in mind. As such they suffer a number of drawbacks for executing memory-intensive workloads like database management systems.

1. Typically, the managed heap space is typically much smaller than the overall amount of RAM available from the server (historically to encourage more frequent but smaller runs of the garbage collection algorithm).
2. Pathologically, the garbage collection algorithm may require exclusive access to the heap space to clear out unused objects which pauses the running program (known as stop-the-world garbage collection).
3. Ultimately it is still possible to exhaust the heap space when the garbage collection algorithm cannot keep up with the rate of memory allocation and deallocation. This causes an unrecoverable fault and will require the database management system to be rebooted.

In data-intensive systems, it is common to use the heap for fast allocation and access to objects required by the running program (the data structures required by the database management system to process transactions), and to use off-heap memory for large amounts of data (such as the contents of transactional updates). This minimizes but does not entirely prevent exhaustion of the available heap space.

Exhausting heap memory has consequences for the stability, availability, and throughput of the database. Exhaustion is hard to predict. For example, a large or long-lived transaction may overwhelm a busy system but be readily processed by a less busy system.

Typically, the actual data to be inserted into the database as part of the transaction is stored in the plentiful (but slower) off-heap region of memory (or even on disk if it needs to spill over). The aim is to support volume over raw performance.

Conversely, the data structures required by the database management system to process transactions are kept in the fast, but small, managed heap. The heap is intended to store various data structures, such as locks, path contexts, query plans, and so forth.

In various embodiments, a system as disclosed herein allows transactional updates of any size to potentially execute (up to a limit specified by the database management system's operator), constrained by the demands of the prevailing workload. Specifically, it prevents unconstrained access to heap space as is typical for most applications.

Figure 1B:
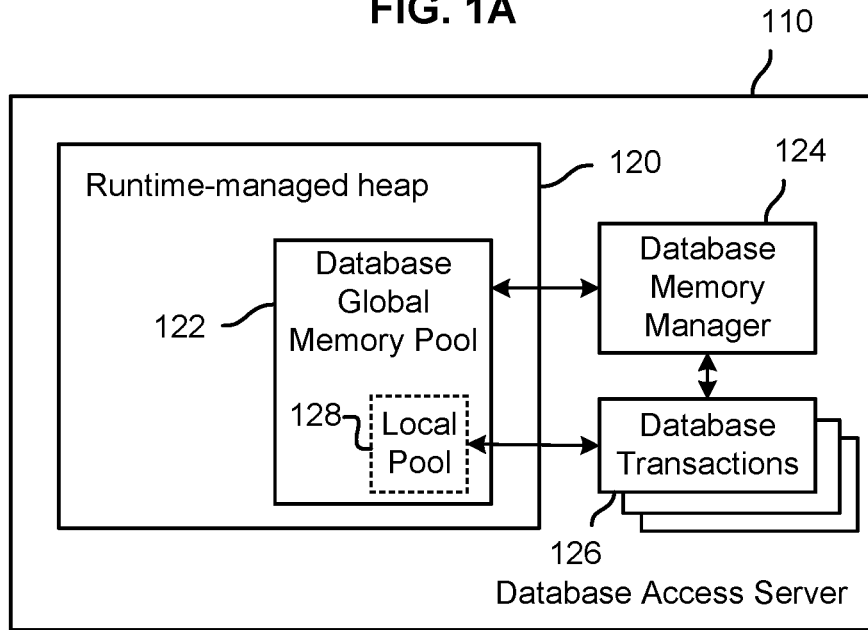
FIG. 1B is a block diagram illustrating an embodiment of a database access server configured to implement memory guards to provide continuous load-adaptive processing of transactions.

FIG. 1B is a block diagram illustrating an embodiment of a database access server configured to implement memory guards to provide continuous load-adaptive processing of transactions. In the example shown, database access server 110 is shown to include a runtime-managed heap 120, such as a JVM runtime heap. A database global memory pool 122 has been allocated to a database memory manager 124, which may be a process or software module running on database access server 124. In various embodiments, database memory manager 124 allocates portions of the global memory pool 122 to database transactions 126, creating for each a temporary local pool 128 to be used by the corresponding database transaction 126 to perform operations required to complete its transaction. Once a transaction is completed, the associated database transaction 126 releases its local poll 128 back to the database memory manager 124, making the associated portion of global memory pool 122 available to allocated for use by another database transaction 126.

In various embodiments, each database transaction 126 is configured to the memory requirements of an operation prior to allocating memory from its local pool 128 and allowing the operation to be performed. In some embodiments, if more memory is needed an additional allocation of memory is requested from the global pool. If there is sufficient heap space available, the transaction can proceed, otherwise it is safely aborted. Safely aborting is a good choice: it doesn't add load to an already busy system and upholds the transaction guarantees to the end user (it is merely an inconvenience to them).

The reliance on heap memory as an indicator of server capacity is helpful: since transactions are aborted only when there is insufficient memory for them to proceed, enabling the a system as disclosed herein to the prevailing workload.

Figure 2A:
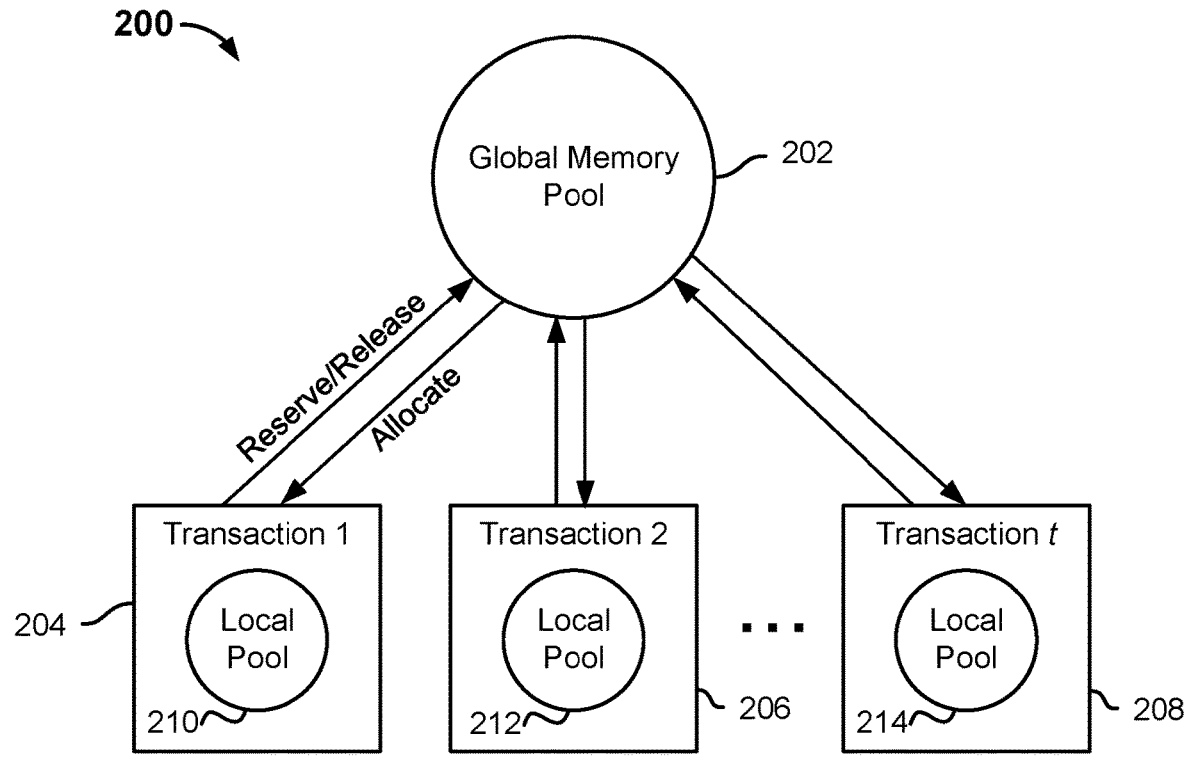
FIG. 2A is a block diagram illustrating techniques to manage memory use across transactions in an embodiment of a database system.

FIG. 2A is a block diagram illustrating techniques to manage memory use across transactions in an embodiment of a database system. In the example shown, memory management system/processes 200 include a global memory pool 202, e.g., global memory pool 122 of FIG. 1, from which transactions (e.g., instances of transaction objects and/or processes) such as transactions 204, 206, and 208 in the example shown in FIG. 2A, obtain allocations of memory to provide temporarily dedicated local memory pools 210, 212, 214.

In various embodiments, a global pool of memory, such as global memory pool 122 of FIG. 1 or global memory pool 202 of FIG. 2A, is sized by the database management system administrator, is established when the database starts, and is maintained for the duration of the system's lifecycle. This global pool is sized, in various embodiments, to consume an appropriate amount of heap memory. In some embodiments, the size may be selected based on expected requirements and system capacity, such as to provide maximum overall transaction processing capacity while minimizing the likelihood of transaction processing causing server crashes due to excessive use of system memory.

Referring further to FIG. 2A, in the example shown, when a transaction 204, 206, 208 begins, it reserves memory from the global pool 202, diminishing the available space. A transaction typically reserves more memory (in some embodiments, up to a user-specified limit) than it immediately needs from the global pool 202 into a local pool 210, 212, 214 so that it can operate locally without contending for repeated access to the global pool 202 in a concurrent processing environment, in which multiple transactions such as transactions 204, 206, and 208 execute concurrently in the same runtime. The capacity of the local pool 210, 212, 214 is set by an administrator to a level which is mechanically sympathetic to the expected database management system's throughput (in some embodiments, up to a user-specified limit).

As each transaction 204, 206, 208 progresses it uses memory from its local pool 210, 212, 214 to do work. In various embodiments, the amount of memory required is computed by using:

All fields on the class being instantiated and on superclasses;

Class layout;

JVM internals (e.g. 32 bit vs 64 bit, compressed pointers, object alignment); and For collections of objects, infrastructure is provided in the form of specialized collection types to measure the memory requirements of the collection as a whole.

Taken together this gives a good estimate of the working space needed which can be taken from the local pool. When an object reaches the end of its usefulness, its space is returned to the local pool though its memory may not be immediately garbage collected by the underlying JVM.

When a transaction completes (commits or aborts), its local pool is released back to the global pool making that heap space available to other transactions. Where there are no other faults, transactions proceed to completion when enough memory is available from their local pool to support complete processing.

In various embodiments, transactions will be aborted in one of two cases:

1. The local pool is exhausted, and the transaction aborts part way through; or
2. The global pool is exhausted and the transaction aborts immediately upon starting.

In some embodiments, heap utilization and system performance may be optimized by allowing individual transactions to request additional allocations of memory, if needed, to potentially avoid aborting a transaction for lack of such memory in the local pool in circumstances in which additional memory may be available from the global pool. At the level of an individual transaction, instead of aborting the transaction immediately when the local pool is exhausted, the transaction is configured to ask for additional allocation from the global pool. If this is granted, the transaction can continue. Otherwise, the transaction is aborted.

Figure 2B:
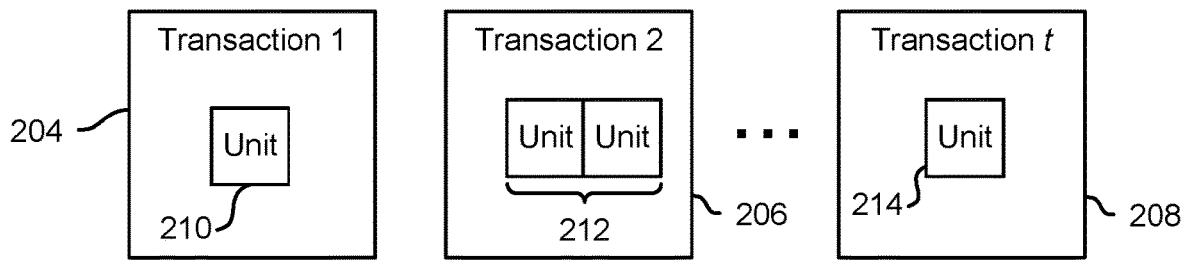
FIG. 2B is a block diagram illustrating techniques to manage memory use across transactions in an embodiment of a database system.

FIG. 2B is a block diagram illustrating techniques to manage memory use across transactions in an embodiment of a database system. In the example shown, the local pools 210, 212, and 214 of FIG. 2A are shown to each include a corresponding number of same-sized memory units. In the example shown, local pools 210 and 214 each has one unit of memory in its local pool. Local pool 212, by comparison, is shown as having two units. In some embodiments, transaction 206 may have first obtained one unit for its local pool 212. Upon determining that insufficient memory remained in its local pool 212 to continue processing the transaction, the transaction 206 may have requested and been allocated a second unit from the global pool 202 shown in FIG. 2A, resulting in the larger, two-unit local pool 212 as shown in FIG. 2B.

Figure 3:
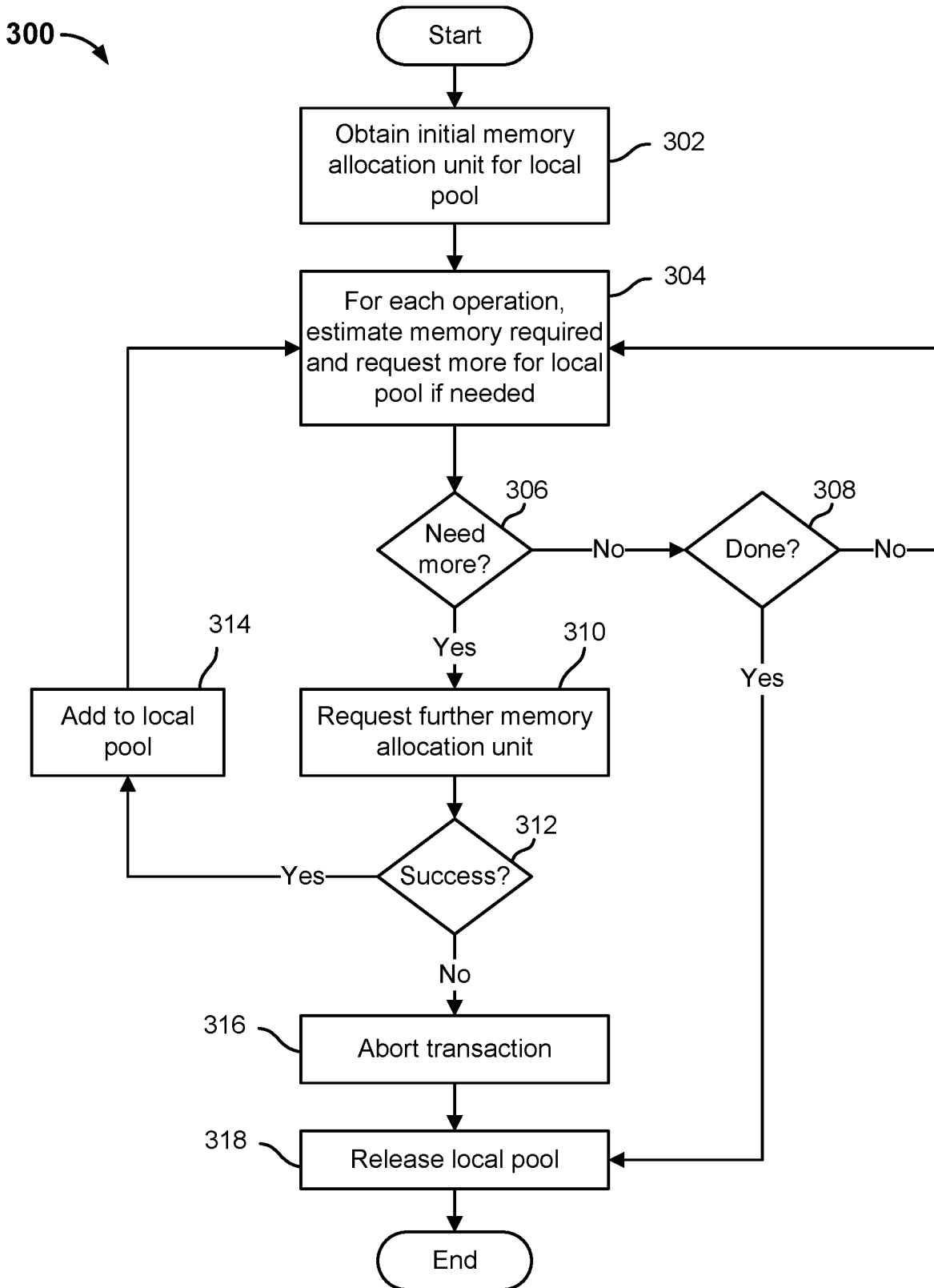
FIG. 3 is a flow diagram illustrating an embodiment of a process to reserve and use a local pool of memory to perform operations associated with a transaction.

FIG. 3 is a flow diagram illustrating an embodiment of a process to reserve and use a local pool of memory to perform operations associated with a transaction. In various embodiments, each transaction, such as transactions 204, 206, and 208 of FIGS. 2A and 2B, may perform the process 300 of FIG. 3. In the example shown, at 302, an initial allocation unit of memory is obtained (reserved) from a global memory pool and used to establish a local memory pool for the transaction.

In some embodiments, when a transaction is received from a client, an initial determination is made as to whether sufficient memory is available in the global pool to allocate an initial unit of memory for a local pool to be dedicated to the transaction. If not, the transaction is aborted immediately, without obtaining allocation of an initial pool at 302.

At 304, for each operation (or set of operations) the memory required to perform the operation(s) is estimated and a determination is made whether sufficient memory remains in the local pool to support the operation(s). If sufficient memory is available in the local pool (306), the operation(s) is/are performed and transaction processing continues (308). If it is determined there is not sufficient memory available in the local pool to perform the operation(s) (306), at 310 allocation of a further allocation unit of memory from the global pool is requested. If the additional allocation unit is allocated (312), the allocated additional unit is added to the local pool at 314 and transaction processing continues. If, by contrast, the request for an additional allocation unit is refused (312), the transaction is aborted at 316. Transaction processing continues unless/until it is aborted at 316 or completed (308), at which time the local memory pool is release back to the local pool at 318.

Figure 4:
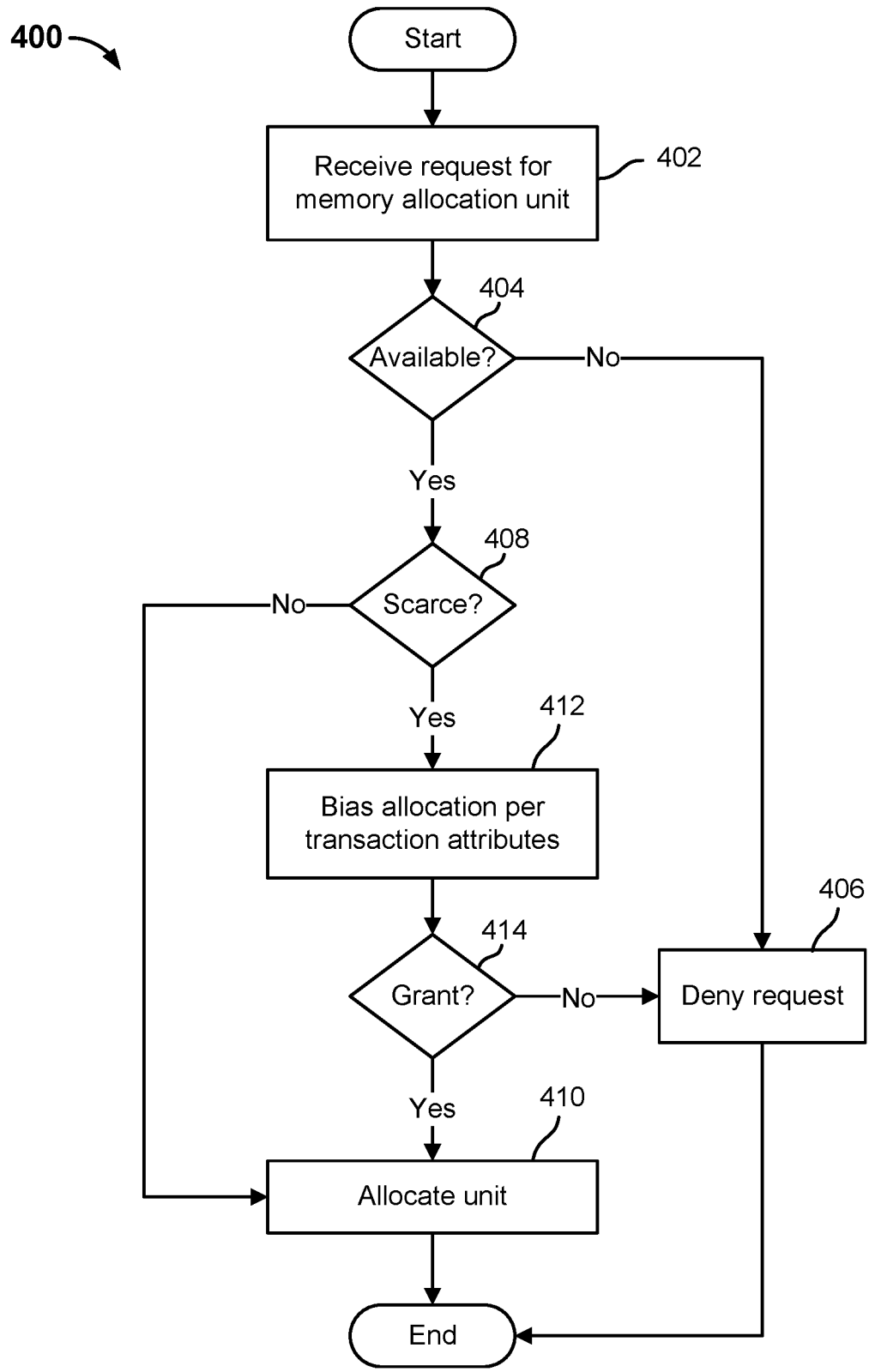
FIG. 4 is a flow diagram illustrating an embodiment of a process to manage and allocate portions of a global pool of memory to be used to perform database transactions.

FIG. 4 is a flow diagram illustrating an embodiment of a process to manage and allocate portions of a global pool of memory to be used to perform database transactions. In various embodiments, the process 400 of FIG. 4 is performed by a database memory manager module, such as database memory manager 124 of FIG. 1B. In various embodiments, an iteration of process 400 may be performed in response to each request, e.g., from a transaction, for allocation of an additional unit of memory from the global pool.

In the example shown, at 402, upon receiving a request for allocation of an additional unit of memory from the global pool, it is determined at 404 whether sufficient memory remains in the global pool to satisfy the request. The simplest function to determine whether allocation will proceed is simple arithmetic: if remaining size of global pool minus requested allocation is greater than zero, the memory is granted, otherwise it is not. In other embodiments more sophisticated heuristics or learned functions can be used to improve the chance of allocation when the global pool is nearing exhaustion.

If there is not sufficient memory remaining in the global pool to allocate an additional unit to the requesting transaction (404), regardless of any characteristics of the requesting transaction, the request is denied at 406, which in various embodiments will result in the transaction being aborted. If there is still memory available in the global pool, it is determined at 408 whether memory remaining in the global pool is scarce. For example, if the memory remaining available in the global pool (i.e., not already and currently allocated to a transaction) has fallen below a threshold, global memory may be determined at 408 to be available but scarce. If the remaining memory is not determined at 408 to be scarce, the requested additional unit is allocated at 410. If, instead, the remaining memory is determined at 408 to be scarce, at 412 the allocation request is biased based on one or more configured attributes of the requesting transaction and/or other considerations.

In various embodiments, at the global pool level, a biasing function can be injected to allow preferences for which transactions are given additional memory for their local pools. For example, the function might bias allocation towards long-lived transactions which are more likely to be close to committing at the expense of younger transactions, or it might bias towards less memory intensive transactions (fewer requests for additional allocation) on the basis that they are more frugal and might therefore be more likely to commit. In some embodiments, it is possible to have no bias injected in which case all transactions will be allocated heap memory fairly, up to the limits of the pool size.

Referring further to FIG. 4, if based on the biasing applied at 412 it is determined the request should be granted (414), then the requested additional unit is allocated at 410. If, instead, it is determined based on the biasing applied at 412 that the request should not be granted (414), the request is denied at 406, resulting in the requested allocation unit remaining in the global pool, potentially for later allocation to another transaction that meets the biasing criteria/function applied at 412.

In various embodiments, a system as disclosed herein provides continuity of database transaction processing in a load-adaptive manner such that an optimal throughput can be achieved safely for a given workload and computer server capacity. Overall utilization is adapted to the current workload based on the size of the heap allocation. Transactional updates of any size may be allowed to potentially execute (up to a limit specified by the database management system's operator), constrained by the demands of the prevailing workload.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A database management system, comprising:
   a memory configured to store a runtime-managed heap; and
   a processor coupled to the memory and configured to manage use of a global pool of memory allocated to a database memory manager, the global pool comprising a subset of the runtime-managed heap, including by:
   receiving at the database memory manager, from each of a plurality of transactions comprising a transactional workload directed at the database management system, a request to reserve use of a portion of the global pool of memory for use in processing that transaction; and
   allocating by the database memory manager, to each of at least a subset of the requesting transactions, a corresponding portion of the global pool of memory, to be used as a temporary local pool of memory available to be used by the transaction to process the transaction;
   wherein a given transaction is aborted based at least in part on a determination that a memory requirement associated with a next operation associated with the given transaction exceeds an amount of memory that remains available in the temporary local pool of memory that has been allocated to the given transaction and a request to allocate additional memory to the temporary local pool is denied by the database memory manager.

2. The system of claim 1, wherein the processor is further configured to request allocation of the global pool from a runtime that manages the heap.

3. The system of claim 2, wherein the size of the global pool is set by a configuration data.

4. The system of claim 1, wherein the processor is configured to allocate a portion of the global pool of memory to a requesting transaction based at least in part on a determination that sufficient memory remains available in the global pool to accommodate the request.

5. The system of claim 1, wherein memory is allocated from the global pool in allocation units of a prescribed size.

6. The system of claim 5, wherein each transaction is configured to determine a memory requirement associated with a set of one or more operations to be performed next in connection with the transaction and proceed with performing the set of one or more operations based at least in part on a determination that sufficient memory remains available in a local pool of the transaction to satisfy the determined memory requirement.

7. The system of claim 6, wherein each transaction is further configured to request allocation of an additional allocation unit of memory from the global pool based at least in part on a determination that the local pool does not have sufficient memory available to satisfy the determined memory requirement.

8. The system of claim 7, wherein to processor is further configured to allocate an additional allocation unit of memory from the global pool to the requesting transaction.

9. The system of claim 8, wherein the processor is configured to allocate the additional allocation unit of memory based at least in part on a determination that sufficient memory is available in the global pool to allocate the additional allocation unit.

10. The system of claim 9, wherein the processor is configured to make the determination that sufficient memory is available in the global pool to allocate the additional allocation unit at least in part by applying a biasing function with respect to one or more attributes of the transaction.

11. The system of claim 10, wherein one or more elements of the biasing function are configurable by an administrative user of the database management system.

12. The system of claim 1, wherein a transaction is configured to abort the transaction with which it is associated based at least in part on a determination that insufficient memory exists in its local pool to process the transaction.

13. The system of claim 1, wherein a transaction is configured to release memory in its local pool back to the global pool upon committing or aborting the transaction.

14. A method to manage use of a global pool of memory allocated to a database memory manager, the global pool comprising a subset of the runtime-managed heap, comprising:
   receiving at the database memory manager, from each of a plurality of transactions comprising a transactional workload of a database management system, a request to reserve use of a portion of the global pool of memory for use in processing that transaction; and
   allocating by the database memory manager, to each of at least a subset of the requesting transactions, a corresponding portion of the global pool of memory, to be used as a temporary local pool of memory available to be used by the transaction to process the transaction;

wherein a given transaction is aborted based at least in part on a determination that a memory requirement associated with a next operation associated with the given transaction exceeds an amount of memory that remains available in the temporary local pool of memory that has been allocated to the given transaction and a request to allocate additional memory to the temporary local pool is denied by the database memory manager.

15. The method of claim 14, further comprising requesting allocation of the global pool from a runtime that manages the heap.

16. The method of claim 14, wherein a portion of the global pool of memory to is allocated to a requesting transaction based at least in part on a determination that sufficient memory remains available in the global pool to accommodate the request.

17. The method of claim 14, wherein memory is allocated from the global pool in allocation units of a prescribed size.

18. The method of claim 17, wherein each transaction is configured to determine a memory requirement associated with a set of one or more operations to be performed next in connection with the transaction and proceed with performing the set of one or more operations based at least in part on a determination that sufficient memory remains available in a local pool of the transaction to satisfy the determined memory requirement.

19. The method of claim 18, wherein each transaction is further configured to request allocation of an additional allocation unit of memory from the global pool based at least in part on a determination that the local pool does not have sufficient memory available to satisfy the determined memory requirement.

20. A computer program product to manage use of a global pool of memory allocated to a database memory manager, the global pool comprising a subset of the runtime-managed heap, the comprising computer program product being embodied in a non-transitory computer readable medium and comprising computer instructions for:
   receiving at the database memory manager, from each of a plurality of transactions comprising a transactional workload of a database management system, a request to reserve use of a portion of the global pool of memory for use in processing that transaction; and
   allocating by the database memory manager, to each of at least a subset of the requesting transactions, a corresponding portion of the global pool of memory, to be used as a temporary local pool of memory available to be used by the transaction to process the transaction;
   wherein a given transaction is aborted based at least in part on a determination that a memory requirement associated with a next operation associated with the given transaction exceeds an amount of memory that remains available in the temporary local pool of memory that has been allocated to the given transaction and a request to allocate additional memory to the temporary local pool is denied by the database memory manager.

* * * * *